March 1, 1927.  R. J. McFALL  1,619,143
LEATHER MEASURING MACHINE
Filed Aug. 24, 1923  2 Sheets-Sheet 1

Inventor:
Robert J. McFall,
by Macleod, Calver, Copeland & Dike,
attys.

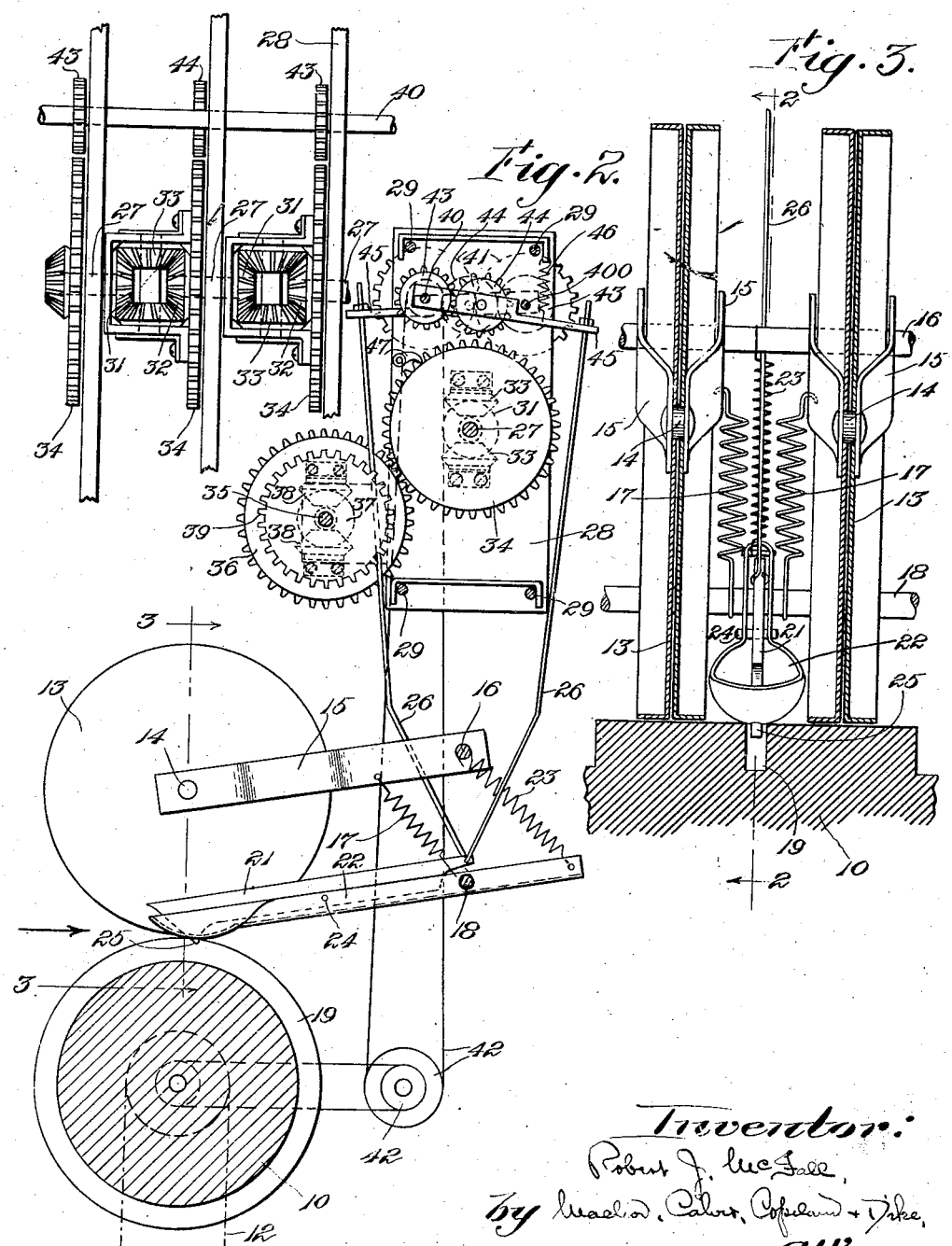

Patented Mar. 1, 1927.

1,619,143

UNITED STATES PATENT OFFICE.

ROBERT J. McFALL, OF AMHERST, MASSACHUSETTS.

LEATHER-MEASURING MACHINE.

Application filed August 24, 1923. Serial No. 659,107.

This invention relates to measuring machines of the general type shown and described in my prior application filed December 2, 1921, Serial No. 519,501, and designed particularly for the purpose of measuring the irregular surfaces of such articles or materials as hides, skins, leather, etc.

The machine shown in said prior application comprises measuring mechanism whereby a hide or the like passed through the machine is theoretically divided into a series of strips of equal width and whose length is measured, together with totalizing or cumulating mechanism by means of which the areas of the strips so measured are totalized to obtain the total area of the hide. The measuring mechanism comprises means for feeding the hide through the machine, together with contact mechanism comprising a series of contact members or devices arranged transverse of the machine and adapted to be actuated by the hide as it is fed through the machine, the number of contact devices so actuated depending upon the width of the hide, and the consequent number of strips into which it is divided, and the period of actuation of the several contact devices depending upon the length of said strips respectively. The totalizing mechanism comprises a series of cumulating members corresponding in number to the contact devices and controlled thereby, respectively, in such a manner as to cause each cumulating member to be operated during the period of actuation of the corresponding contact member, said cumulating members being so connected as to cause the totals corresponding to the extent of operation of the several cumulating members to be accumulated into a grand total representing the area of the entire hide.

In the machine shown in said prior application, the connections between the several contact members and the respective cumulating members comprise electrical devices, whereby, upon actuation of the contact members, circuits are closed to electromagnets which control the operation of the cumulating members.

The present invention has for an object to simplify the mechanism shown in said prior application by the elimination of said electric devices and the substitution therefor of direct and simple mechanical connections betwen the cumulating devices and the contact members, whereby the operation of the former is controlled by the actuation of the latter. Another object of the invention is to provide an improved contact member and contact carrier therefor particularly adapted for use in connection with the mechanical controlling devices above mentioned to produce accurate results. A further object of the invention is to provide an improved cumulating mechanism whereby the capacity and accuracy of the machine are increased. A still further object of the invention is to improve, simplify, cheapen and lighten the feeding means forming a part of the measuring mechanism.

The foregoing and other objects of the invention, together with means whereby the same may be carried into effect, will best be understood from the following description of one form or embodiment thereof illustrated in the accompanying drawings. It will be understood, however, that the particular construction described and shown has been chosen for illustrative purposes merely, and that the invention, as defined by the claims hereunto appended, may be otherwise practiced without departure from the spirit and scope thereof.

In said drawings:

Fig. 2 is a section taken substantially on the lines 2—2, Figs. 1 and 3, and on a scale somewhat larger than that of Fig. 1, illustrating the connections between one of the contact devices and the corresponding cumulating member.

Fig. 3 is a section on a further enlarged scale taken substantially on the line 3—3, Fig. 2.

Fig. 4 is a fragmentary detail view of a portion of the cumulating mechanism, the scale being somewhat larger than that of Fig. 2 but smaller than that of Fig. 3.

Figure 1:
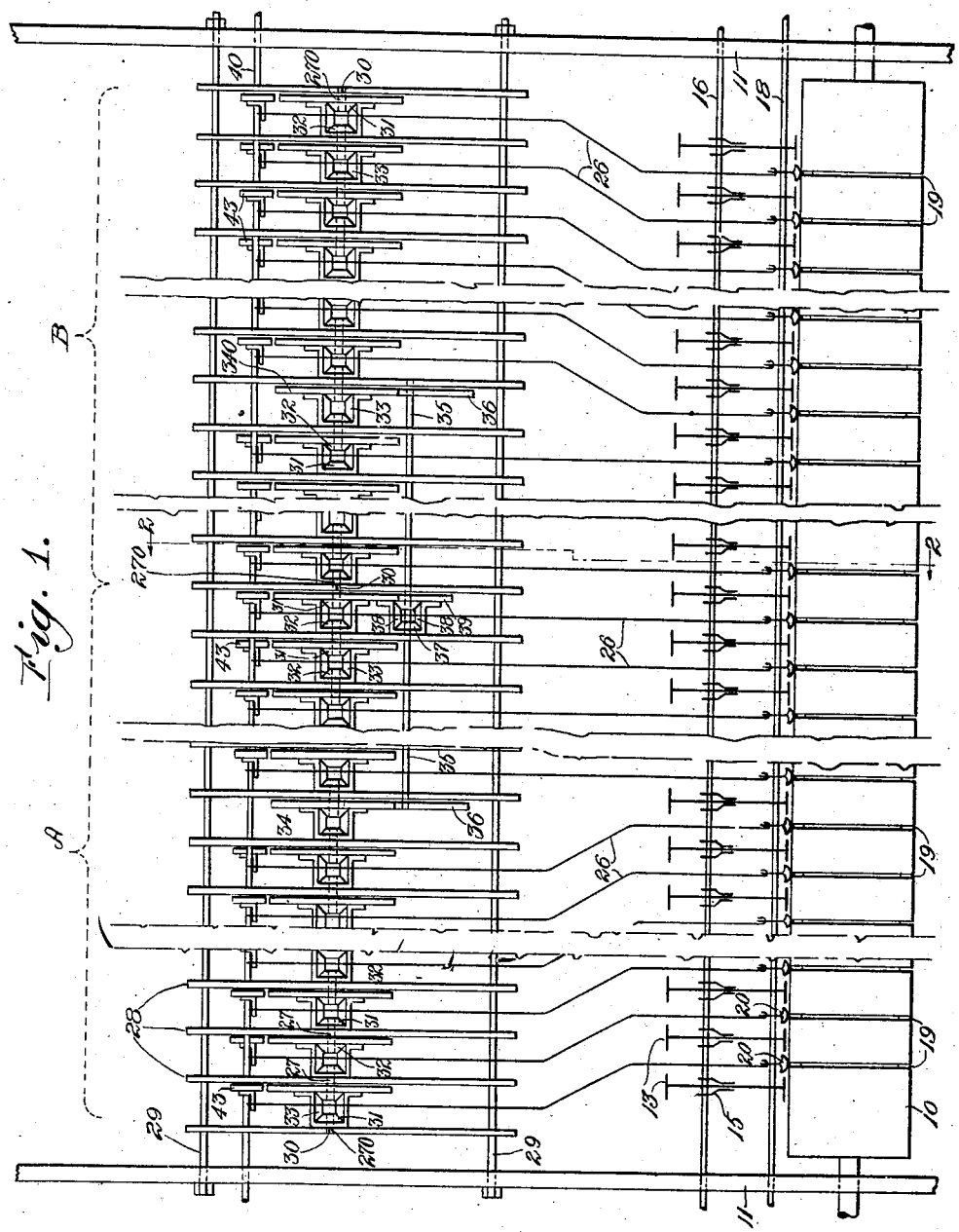
Fig. 1 is a diagrammatic front elevation of substantially the complete machine.

The feeding mechanism comprises a bed roll 10 which extends transversely of the machine and is journalled at its ends in uprights 11 constituting the ends of the machine frame.

Said bed roll is suitably driven from any convenient source of power, as by a belt or chain 12 (Fig. 2). Cooperating with the bed roll 10 is a series of pressure rolls or disks 13, each of which comprises a sheet metal (preferably steel) stamping consisting of two dished members placed back to back to form a web portion and a peripheral rim or flange adapted to bear upon the material as it passes over the bed roll. Each pressure roll or disk is journalled on a stud 14 carried by a pair of arms 15 suitably shaped to embrace the rim of the roll and pivotally mounted to swing upon a rod 16 supported at its ends in the uprights 11 and disposed parallel to the bed roll 10. The arms 15 are connected by springs 17 with a second transverse rod 18 disposed parallel to the rod 16 and also supported at its ends in the uprights 11. This construction is a very light and inexpensive one, while providing for the requisite pressure upon the leather over a sufficient area to spread the material out flat and insure the necessary traction, during the passage of said material over the bed roll, to prevent slipping and insure the accuracy of the result.

Between adjacent pressure rolls or disks 13 the bed roll 10 is formed with circumferential grooves 19 with which cooperate the contact devices, designated as a whole in Fig. 1 by the numeral 20. As shown more clearly in Figs. 2 and 3, each contact device comprises a contact member 21 and a contact carrier 22. Each contact carrier 22 comprises a lever pivotally mounted on the rod 18 and the rear end of which is connected by a spring 23 with the rod 16. Said lever is substantially U-shaped in cross section for the major portion of its length, but is formed with a spoon-shaped forward end which is pressed against the bed roll 10, or against the upper surface of a hide passing over the latter, by the spring 23. Each contact member 21 comprises a second lever located between the side flanges of the lever 22 and pivoted thereto at a point 24 eccentric to the rod 18 and preferably between the latter and the work. At its forward end the lever 21 is formed with a contact tip or point 25 which projects through a suitable opening in the forward spoon-shaped end of the lever 22, and is normally received in the corresponding groove 19 in the bed roll 10. The rear end of the lever 21 is located closely adjacent the rod 18, which constitutes the fulcrum of the lever 22, and secured to said rear end of the lever 21 closely adjacent or immediately above said fulcrum is the lower end of a link 26, which constitutes the connection between the contact member and the corresponding cumulating member through which the latter is controlled by said contact member, as hereinafter described.

The hides are fed through the machine in the direction of the arrow on Fig. 2, and as the portion of the edge of a hide opposite any particular contact device engages the spoon-shaped end of the contact carrier of said device, said contact carrier will be lifted to the surface of the work, turning about the rod 18 and carrying with it the contact member 21 without, however, turning the latter upon its pivot 24. When the edge of the hide engages the tip 25 of the contact member 21, the latter is rocked upon its pivot 24 with respect to the contact carrier. By reason of the connection of the link 26 with the contact member 21 at a point adjacent, or immediately over, the rod 18, which constitutes the fulcrum for the contact carrier 22, movement of the latter about its fulcrum, upon the initial engagement of the edge of the hide therewith, will not move the link 26, which link is actuated only upon movement of the contact member 21 about its pivot 24 with respect to the contact carrier when the point 25 is engaged by the edge of the leather. By this arrangement the mechanism is rendered very accurate, since the time of engagement of the edge of the leather with the point 25 of the contact member can be accurately determined and is entirely independent of the thickness of the material.

The totalizing or cumulating mechanism, in accordance with the present invention, comprises what may be termed a sectional primary cumulating mechanism, each section of which includes a suitable number of cumulating members and is adapted to accumulate the results of the operations of its several constituent cumulating members, together with what may be termed a final cumulating mechanism for totalizing the results accumulated by the several sections of said primary cumulating mechanism.

As herein shown, the primary cumulating mechanism comprises two sections designated in Fig. 1 as A and B, respectively. Each section comprises a set of alined shaft sections 27 (see also Figs. 2 and 4) supported by vertical partition plates 28 which are carried by parallel transverse rods 29 secured at their ends in the frame uprights 11. The end shaft sections 270 of each set are keyed, or otherwise secured against rotation, to their respective supporting plates 28, as indicated at 30 in Fig. 1, the remaining shaft sections being journalled in said plates. Contiguous shaft sections of the several sets are connected by differential mechanisms which, as herein shown, are of the type shown and described in my prior application above referred to. Each of said differential mechanisms comprises an initial bevel pinion 31 on one shaft section, a final bevel pinion 32 on the other shaft section, planetary bevel pinions 33 meshing with the pinions 31 and 32, and a ring gear 34 rotatably mounted on one of the shaft sections and by which said pinions 33 are carried. An intermediate ring gear 340 of each section of the primary cumulating mechanism is operatively connected with the final cumulating mechanism to actuate the latter, while the remaining ring gears 34, which correspond in number to the contact members 21, constitute the cumulating members whose operation is controlled by said contact members respectively. Each shaft section 27 has at one end the final pinion 32 of one differential mechanism and at its opposite end the initial pinion 31 of the next succeeding differential mechanism in the direction toward the intermediate ring gear 340, so that, if alternate ring gears 34 be rotated in opposite directions, the motion imparted to the final pinion of any differential mechanism will be the sum of the motions of all of the ring gears 34 at the side thereof toward the adjacent fixed shaft section 270, including that of the ring gear of the differential mechanism in question, while the motion imparted to the ring gear 340 of each section of the primary cumulating mechanism will be the sum of the motions of all of the ring gears of that section. From the foregoing it will be understood that motion is communicated to the differential system through the ring gears 34 and is taken therefrom and communicated to the final cumulating mechanism through the ring gears 340.

The final cumulating mechanism comprises a differential mechanism similar to that above referred to and includes alined shaft sections 35 journalled in certain of the partition plates 28 and having on their outer ends gears 36 meshing with the ring gears 340, and bevel pinions 37 on the adjacent ends of said shaft sections, said pinions meshing with planetary pinions 38 carried by a ring gear 39 adapted to actuate a suitable register, not shown.

The mechanism for actuating the ring gears or cumulating members 34 under the control of the contact members 21 will now be described. Journalled in the frame uprights 11 and partition plates 28, above the ring gears 34, are two parallel shafts 40 and 400 connected with each other by gears 41 and one of which, herein the shaft 40, is connected, as by chain and sprocket gearing, generally indicated at 42, with the bed roll 10, whereby said shafts are continuously rotated in opposite directions at a speed proportional to the speed of rotation of said bed roll. The shafts 40 and 400 have fast thereon pinions 43 which correspond in number and arrangement to the ring gears 34, alternate pinions being carried by the shafts 40 and 400, respectively. Meshing with the pinions 43 are pinions 44 rotatably mounted in carriers in the form of levers 45 fulcrumed on the shafts 40 and 400 and to the free ends of which the upper ends of the several links 26 are connected respectively. In accordance with the arrangement of the pinions 43, alternate levers 45 are fulcrumed respectively on the shafts 40 and 400, and extend in opposite directions, alternate links 26 being correspondingly offset toward the front and rear, as will be clear from Fig. 2. Also in order to provide for the inclusion of the ring gears 340 with the ring gears 34 in the differential system certain of the links 26 may be laterally offset, as indicated in Fig. 1. The levers 45 are normally held in elevated positions, with the pinions 44 out of mesh with the ring gears 34, as shown in Fig. 2, by means of springs 46 connecting said levers to fixed parts of the frame, but are depressed to cause the pinions 44 to mesh with the respective ring gears 34, when the forward ends of the corresponding contact members 21 are raised by the leather, thereby depressing the rear ends thereof and drawing downwardly upon the links 26 against the tension of the springs 46. Since alternate pinions 44 are continuously rotated in opposite directions by the pinions 43 on the continuously rotating shafts 40 and 400, alternate ring gears 34 will be similarly rotated, when their respective contact members are actuated, thereby causing the totalizing mechanism to accumulate the total of the rotation of all of said gears, as above explained. If desired, accidental rotation of the several ring gears in the improper direction may be prevented by pawls 47.

Having thus described my invention, I claim:

1. In a leather measuring machine, in combination, means for measuring strips of the material to be measured, means comprising a series of gears for directly cumulating the lengths of said strips, means for actuating said cumulating means, and means mechanically connected with said measuring means and controlled thereby for connecting said cumulating means with said actuating means and disconnecting the same therefrom.

2. In a leather measuring machine, in combination, differential mechanisms, contact mechanisms operated by the passage of leather through the machine, a constantly running actuator, and mechanical means operated by said contact mechanisms for causing said actuator to actuate one or more of said differential mechanisms.

3. In a leather measuring machine, in combination, a bed member, a movable contact carrier, a contact member cooperating with said bed member and movably supported by said contact carrier, said contact member being displaced by the passage of leather over said bed member, and cumulating mechanism mechanically connected with said contact member and controlled by displacement thereof relative to said contact carrier.

4. In a leather measuring machine, in combination, a series of contact members actuated by passage of leather through the machine, a series of corresponding cumulating members, a continuously running actuator, and means mechanically connected with the several contact members for operatively connecting the respective cumulating members with said actuator and disconnecting the same therefrom.

5. In a leather measuring machine, in combination, a series of contact members, actuated by passage of leather through the machine, a series of differentials in which the final pinion of one differential rotates the initial pinion of a succeeding differential, each of said differentials comprising a ring gear, and means mechanically connected with and controlled by the several contact members for rotating the several ring gears respectively.

6. In a leather measuring machine, in combination, a contact member actuated by passage of leather through the machine, a cumulating member, an actuator for said cumulating member, a carrier for said actuator with which the latter is movable into and out of operative engagement with said cumulating member, and a link connecting said carrier and contact member for controlling the movement of the former.

7. In a leather measuring machine, in combination, a cumulating member, a pivoted contact carrier, a contact member movably mounted on said contact carrier, and means connected with said contact member adjacent the pivot of said contact carrier for controlling said cumulating member.

8. In a leather measuring machine, in combination, a cumulating member, means for controlling the actuation thereof, a pivoted contact carrier, a contact member movably mounted on said contact carrier, and a link connecting said contact member and controlling means, said link being connected with said contact member adjacent the pivot of said contact carrier.

9. In a leather measuring machine, in combination, a cumulating member, a contact carrier comprising a lever pivoted on a fixed fulcrum, a contact member comprising a lever pivoted to said contact carrier at a point eccentric to said fulcrum, and means connected with said contact member adjacent said fixed fulcrum for controlling said cumulating member, whereby said last named means is actuated only when said contact member lever is moved with respect to said contact carrier lever and not when said levers are moved together.

10. In a leather measuring machine, in combination, a final cumulating mechanism, a primary cumulating mechanism comprising a plurality of sets of alined shaft sections and differential mechanisms connecting the several sections of each set and each including a ring gear, an intermediate ring gear of each set being operatively connected with said final cumulating mechanism to operate the same, measuring mechanism, and means controlled by said measuring mechanism for operating the remaining ring gears of said primary cumulating mechanism.

In testimony whereof I affix my signature.

ROBERT J. McFALL.